United States Patent
Benner et al.

(10) Patent No.: US 6,238,028 B1
(45) Date of Patent: May 29, 2001

(54) RACK WITH SEVERAL ASSEMBLY LEVELS

(75) Inventors: Rolf Benner; Martina Köhler, both of Herborn; Wolfgang Reuter, Burbach, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/308,086

(22) PCT Filed: Nov. 6, 1997

(86) PCT No.: PCT/EP97/06147

§ 371 Date: May 12, 1999

§ 102(e) Date: May 12, 1999

(87) PCT Pub. No.: WO98/23007

PCT Pub. Date: May 28, 1998

(30) Foreign Application Priority Data

Nov. 19, 1996 (DE) ............................................. 196 47 727

(51) Int. Cl.⁷ ................................................. A47G 29/00
(52) U.S. Cl. .................................... 312/265.3; 312/223.1; 211/192
(58) Field of Search ............................. 312/265.1, 265.2, 312/265.3, 265.4, 257.1, 223.1; 211/189, 190, 191, 192, 26

(56) References Cited

U.S. PATENT DOCUMENTS

| | | | |
|---|---|---|---|
| 2,756,369 | * | 7/1956 | Gorrie ................................. 312/351 |
| 3,056,639 | * | 10/1962 | Caminker et al. .................... 312/351 |
| 3,338,012 | * | 8/1967 | Kappenhagen et al. ........... 312/223.1 |

FOREIGN PATENT DOCUMENTS

| | | |
|---|---|---|
| 285 914 | 1/1953 | (CH) . |
| 2 043 699 | 3/1972 | (DE) . |
| 41 37 836 C1 | 3/1993 | (DE) . |
| 94 06 323 | 9/1994 | (DE) . |
| 43 36 285 | 4/1995 | (DE) . |
| 195 03 289 | 8/1996 | (DE) . |
| 195 37 016 C1 | 10/1996 | (DE) . |

OTHER PUBLICATIONS

Rittal Handbuch 28 (4 pages), No date.

* cited by examiner

Primary Examiner—Peter M. Cuomo
Assistant Examiner—Jerry A. Anderson
(74) Attorney, Agent, or Firm—Pauley Peterson Kinne & Fejer

(57) ABSTRACT

A rack for a switching cabinet having vertical frame pieces. The vertical frame pieces have two protruding fastening elements, both of which contain a fastening section which is mounted parallel to the associated outer edges of the rack and a profiled side which is vertical to the associated outer edges of the rack. The fastening section and the profile edges have rows of fastening cavities spaced at equal distances from each other. This invention provides greater opportunity for mounting built-in fixtures on the rack frame when the distance between the profiled sides of one fastening attachment and the fastening sections of the other fastening attachment is the same as the distance between the fastening cavities or the space corresponds to a multiple of the dividing gap.

13 Claims, 2 Drawing Sheets

RACK WITH SEVERAL ASSEMBLY LEVELS

BACKGROUND OF THE INVENTION

1. Field of the Invention

This invention relates to a rack made of frame legs for a switchgear cabinet, wherein the frame legs have two fastening shoulders with respectively one fastening section arranged parallel with the associated exteriors of the rack and one profiled side arranged vertically with respect to the associated exterior of the rack, and the fastener sections and the profiled sides have rows of fastening retainers spaced apart at equal distances.

2. Description of Prior Art

A rack of this type is known from German Patent Reference DE 43 36 285 A1. Such frame legs are constructed symmetrically in relation to their cross-sectional diagonal line. The fastening shoulders are arranged on both sides of the cross-sectional diagonal line at a connecting section, which faces outward from a corner section of the rack. The fastening sections and the profiled sides with their fastener retainers are attached to the fastening shoulders. The fastening section and the profiled side of a fastening shoulder are arranged at right angles with respect to each other. Assembly rails or the like can be fastened on the fastening retainers. Built-ins, such as electronic units, for example, can then be attached to the assembly rails.

Such assembly rails are described in German Patent Reference DE 195 03 289, for example. The assembly rails, which are U-shaped in cross section, are screwed to the fastener retainers of the fastening shoulders of two adjoining vertical frame legs by means of elbows.

SUMMARY OF THE INVENTION

It is one object of this invention to create a rack of the type mentioned above in which the fastening locations for the built-ins are standardized.

The above object of this invention is achieved by the distance between the profiled sides of the one fastening shoulder and the fastening sections of the other fastener shoulder being respectively equal to the divisional distance of the fastening members, or by the distance corresponding to a multiple of the divisional distance.

Because the distance between the fastener retainers of the profiled sides and the fastening retainers of the fastening sections has a fixed relationship with the divisional distance of the fastener retainers between each other, it is possible to create a rack, wherein the fastening locations for the built-ins form a spatial grid. The built-ins can be arbitrarily installed in this grid in the rack, which provides a great variability of the attachment options of built-ins. In this case the distance can be equal to the divisional distance of the fastener retainers, or it is a multiple of this distance. Here, a multiple can also be a fraction of the distance. It is important that a circumferential fastening grid results. It is also possible within the divisional difference to use intermediate fastener retainers in the rows of fastener retainers in the fastening grid.

In accordance with one advantageous embodiment of this invention, the fastening sections of two adjacent vertical frame legs of the rack form a first assembly level, and the profiled sides extending parallel therewith form a second assembly level. The continuous assembly rails can be fastened on the fastening retainers of the fastening sections and of the profiled sides.

The two assembly levels are spaced apart from each other at the divisional distance or a multiple thereof. Attachment options for built-ins of different width result because of these two parallel assembly levels.

It is advantageous if the assembly rails have a support section arranged on the first or second assembly level and which has at least one row of fastener retainers. The fastener retainers have the same divisional distance from each other, which corresponds to the divisional distance at the profiled sides, or respectively the fastening sections or a multiple thereof. Thus the divisional grid formed by the fastener retainers of the frame legs is continued in the assembly rails.

A simple design of the assembly rail is distinguished because it is formed, U-shaped in cross section, by the support section and two strips connected therewith, which are spaced apart and positioned parallel from each other.

If the strips of the assembly rail have fastener retainers, further attachment possibilities for built-ins are provided. A fixed divisional grid is also maintained with the rows of fastener retainers.

For the attachment of assembly rails on the frame legs, an embodiment in accordance with this invention is distinguished because tabs projecting toward the front are formed on the support section of the assembly rail, which can be fixed in place by fastening elements on the fastening sections or the profiled sides. The tabs are offset in relation to the support section, so that the support section lies on the level formed by the profiled sides/fastening sections. Thus the assembly rails are located on the assembly levels formed by the profiled sides/fastening sections.

In accordance with a further embodiment of this invention, wall elements can be attached to the fastening elements and/or the profiled sides. Linings, for example, can be attached as wall elements, which cover an entire side or only a partial area of the side of the rack. The wall elements can also be designed as assembly plates.

In this case in particular exterior walls can be arranged parallel with the wall elements and shafts, for example for cables, insulating, absorbing material, or as air-guidance channels, can be formed between the wall elements and the exterior walls.

BRIEF DESCRIPTION OF THE DRAWINGS

This invention will be explained in greater detail in the specification by an exemplary embodiment shown in the drawings wherein.

DESCRIPTION OF PREFERRED EMBODIMENTS

Figure 1:
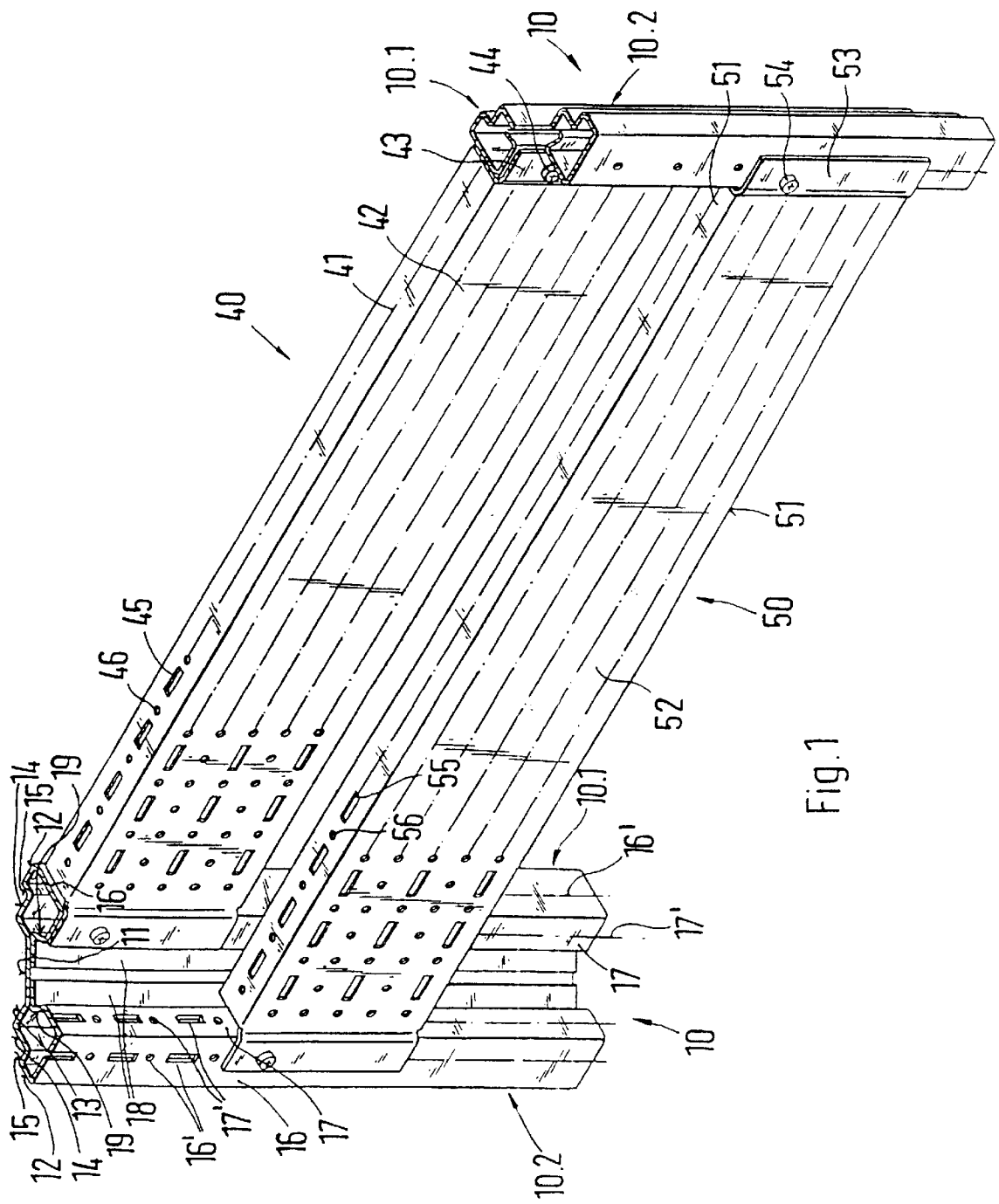
FIG. 1 is a partial perspective view of an area of a rack with two assembly rails.

FIG. 1 shows two vertical frame legs 10 of a rack. For the sake of greater clarity, only the left frame leg 10 is shown in detail with reference numerals in FIG. 1. However, all vertical frame legs 10 of the rack are identically designed, so that they can be employed in all corner areas.

The frame leg 10 has a connecting section 11, to both sides of which fastening sections 10.1, 10.2 are connected. The two fastening sections 10.1, 10.2 are also identically constructed, so that there is symmetry in relation to the cross-sectional diagonal line of the frame leg 10. A strip section 13 is connected at an angle to the connecting section 11. The strip section 13 makes a transition into a right-angled bend 14. Together with the bevel 15, the bend 14 forms a recessed receiving space. A door element or a wall element can be placed into this receiving space. However, it is also possible to place the bevel into the recess formed in the area between the strip sections 13 and the connecting section 11. A sealing contact strip 12 adjoins the bevel 15 at right angles. A wall element, such as identified individually by reference numeral 20 in FIG. 2, can be placed against the sealing contact strip 12 and sealed.

As shown in FIG. 1, adjoining the sealing contact strip 12 the fastener section 10.1, 10.2 has two profiled elements extending at right angles to each other, which are individually marked as profiled side 16 and fastening section 17. Each of the profiled side 16 and the fastening section 17 respectively have a row of fastening retainers 16', 17', which in this case are designed as rows of holes. The fastening retainers are separated at uniform distances.

An undercut dovetailed groove with strips 19 and end sections 18, facing the interior of the rack, is formed between the two fastener shoulders 10.1, 10.2. The end sections 18 are placed on top of the connecting strip 11 and fixed in place on the connecting strip 11, for example welded.

Assembly rails 40, 50 can be fastened between the two vertical frame legs 10. The assembly rails 40, 50 are formed with a U-shaped cross section from a support section 42, 52 and strips 41, 51 connected therewith, which are spaced apart parallel with each other. Rows of fastener retainers 45, 46, 55, 56 are cut into the support section 42, 52 and the strips 41, 51 of the assembly rails 40, 50. In this case, holes and slits are alternatingly provided. The holes are at identical divisional distances from each other. The slits are also offset in relation to each other by the amount of the divisional distance. The divisional distance between the holes and slits again corresponds to the divisional distance as realized by means of the fastener retainers 16', 17' in the profiled sides 16, or respectively the fastening sections 17. For attaching the assembly rails 40, 50, the fronts of the support sections 42, 52 are extended by means of tabs 43, 53. Screw retainers are cut into the tabs 43, 53, into which fastener elements 44, 54 are inserted and connected with the fastening retainers 16', 17' of the profiled sides 16, or respectively fastening sections 17. On their side facing the vertical frame leg 10, the tabs 43, 53 have hooks and/or pins (not shown). Thus, the assembly rails can be prepositioned on the fastening retainers 16', 17'.

In the present case, the distance between the profiled sides 16 of the one fastening shoulder 10.1, 10.2 and the fastening section 17 of the other fastening shoulder 10.1, 10.2 corresponds to the divisional distance between the fastener retainers 16', 17', 45, 46, 55, 56. Thus, the support sections 42, 52 of the assembly rails 40, 50 form two assembly levels which are offset parallel in relation to each other. Here, the offset corresponds to the amount of the divisional distance.

As shown in FIG. 1, the support sections 42, 52 are aligned flush with the profiled sides 16, or respectively with the fastening section 17. Transition sections are formed on the tabs 43, 53 for this purpose, which hold the support section 42, 52. The rows of holes in the strips 41, 51 of the assembly rails 40, 50 transition into the associated rows of holes of the fastening sections 17, or respectively of the profiled sides 16.

Figure 2:
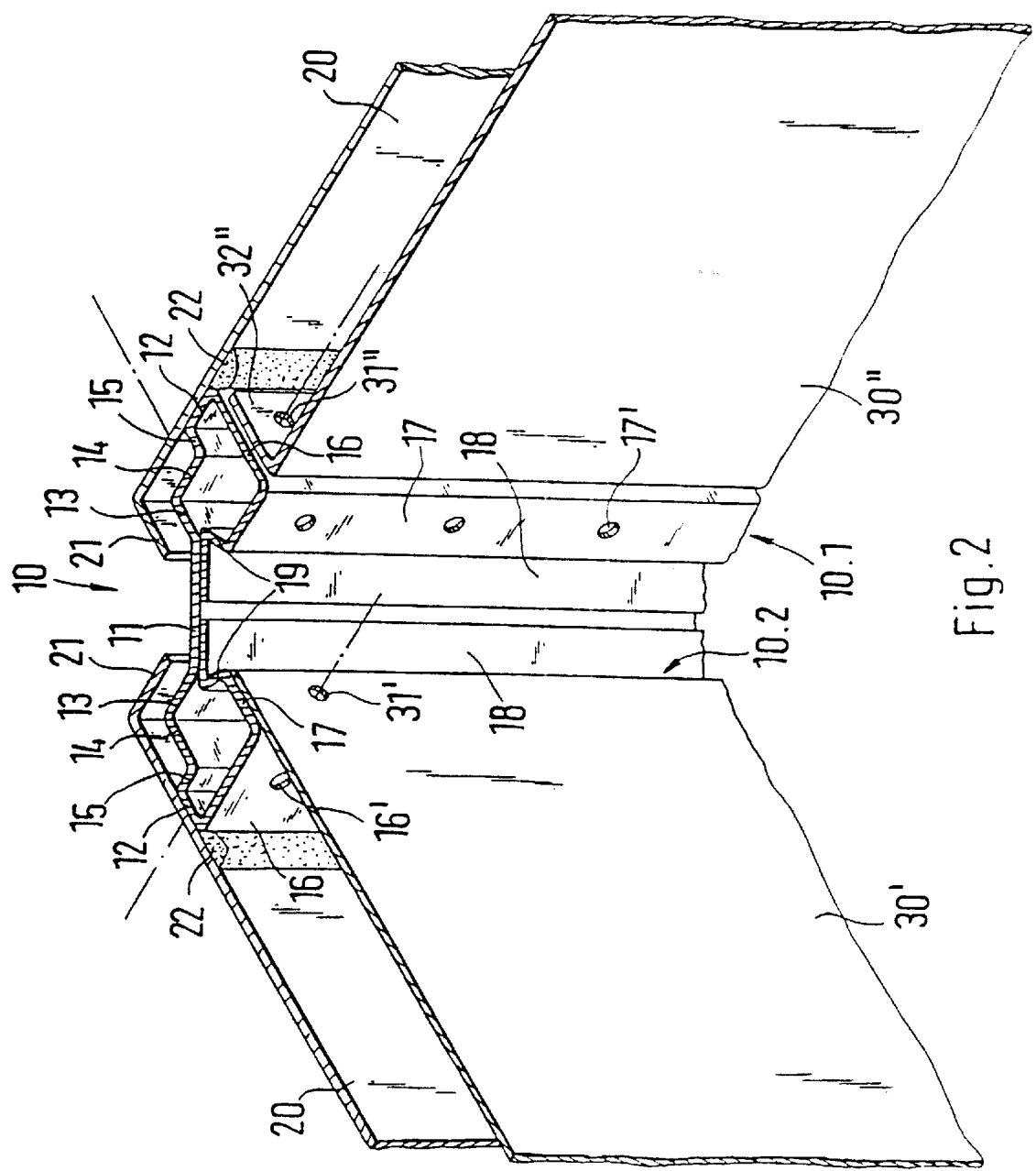
FIG. 2 is a partial perspective view of a vertical frame leg of the rack with wall elements installed.

The attachment of wall elements on the frame leg 10 is shown in FIG. 1 and in FIG. 2. The wall elements 20 are placed on the sealing contact strips 12 facing outward and support seals 22, with which they are sealingly placed against the sealing contact strips 12. The bevels 21 of the wall elements 20 project into the receiving space formed in front of the connecting section 11. The receiving space is recessed with respect to the exterior of the rack frame. An interior wall element 30' can be attached to the left fastening shoulder 10.2. The wall element 30' has screw retainers 31' for this purpose. Fastening screws can be inserted into the screw retainers 31' and screwed together with the fastening retainers 17' of the fastening section 17. In the present case the wall element 30' can be employed as an assembly plate, to which built-in units are attached. A shaft is formed between the wall element 20 and the assembly plate, into which installation and absorbing materials can be placed, or can be used as an air-guidance channel.

An alternative application of a further wall element 30" is represented on the fastening shoulder 10.1. The wall element 30" has a bevel 32" facing the exterior of the rack frame. Bores 31" are cut into the bevel 32". The wall element 30" can be screwed together with the profiled side 16 of the fastening shoulder 10.1 through the bores 31". Once the wall element 30" is fixed in place, the wall element 20 constituting the exterior of the rack frame can be attached. A shaft is also formed between the wall element 20 and 30".

It is respectively shown in the present embodiments that two spatially separated fastening shoulder 10.1, 10.2 are fixed in place on one connecting strip 11. However, in accordance with the crux of this invention it is also possible for the two fastening shoulder 10.1, 10.2 to be united. It is important that the divisional distances in accordance with this invention between the profiled sides 16 and the fastening shoulders 17 are maintained.

What is claimed is:

1. In a rack having frame legs (10) for a switchgear cabinet, wherein the frame legs have two fastening shoulders (10.1, 10.2), each of the fastening shoulders (10.1, 10.2) adapted for receiving an exterior wall selected from a group of two perpendicular walls of the switchgear cabinet, each of the fastening shoulders (10.1, 10.2) having a fastening section (17) arranged parallel with the exterior wall of the rack and a profiled side (16) arranged perpendicularly with the exterior wall, and wherein the fastening sections and the profiled sides have rows of fastener retainers (16', 17') spaced apart at equal distances, the improvement comprising:

opposing sections of the fastening sections (17) of two vertical frame legs (10) forming a first assembly level, and opposing sides of the profiled sides (16) of said two vertical frame legs (10) forming a second assembly level, and a plurality of assembly rails (40, 50) fastened on the fastener retainers (16', 17') of the opposing sections and on the fastener retainers of the opposing sides, thereby placing at least one assembly rail interior to another assembly rail with respect to the exterior wall of the rack.

2. In a rack having frame legs (10) for a switchgear cabinet, wherein the frame legs have two fastening shoulders (10.1, 10.2), each of the fastening shoulders (10.1, 10.2) adapted for receiving an exterior wall selected from a group of two perpendicular walls of the switchgear cabinet, each of the fastening shoulders (10.1, 10.2) having a fastening section (17) arranged parallel with the exterior wall of the rack and a profiled side (16) arranged perpendicularly with the exterior wall, and wherein the fastening sections and the profiled sides have rows of fastener retainers (16', 17') spaced apart at equal distances, the improvement comprising:

a perpendicular distance between the profiled side (16) of the one fastening shoulder (10.1) and the fastening section (17) of the other fastening shoulder (10.2) is equal to a distance between centers of adjacent similar fastener retainers in any said row of fastener retainers, opposing sections of the fastening sections (17) of two vertical frame legs (10) forming a first assembly level, and opposing sides of the profiled sides (16) of said two vertical frame legs (10) forming a second assembly level, and a plurality of assembly rails (40, 50) fastened on the fastener retainers (16', 17') of the opposing sections and of the opposing sides (16), thereby placing at least one assembly rail interior to another assembly rail with respect to the exterior wall of the rack.

3. In the rack in accordance with claim 2, wherein the assembly rails (40, 50) each have a support section (42) having at least one row of fastener retainers (45, 46, 55, 56), wherein the fastener retainers (45, 46, 55, 56) have the same distance from each other as between the adjacent fastener retainers in any single row of the profiled sides (16) and the fastening sections (17).

4. In the rack in accordance with claim 3, wherein the assembly rails (40, 50) are formed with a U-shaped cross section by the support section (42) and two connected strips (41, 51) spaced apart parallel from each other.

5. In the rack in accordance with claim 4, wherein the strips (41, 51) of the assembly rail (40, 50) have fastener retainers (45, 46, 55, 56) therein.

6. In the rack in accordance with claim 5, wherein a plurality of projecting tabs (43, 53) are formed on the support section (42, 52) of the assembly rail (40, 50) and fixed in place on one of the fastening sections (17) and the profiled sides (16), and the projecting tabs (43, 53) are offset in relation to the support section (42, 52), so that the support section (42, 52) lies on a level formed by one of the profiled sides (16) and the fastening sections (17).

7. In the rack in accordance with claim 6, wherein a plurality of interior wall elements (30', 30") are attached to each shoulder of the frame leg at at least one of the fastening elements (17) and the profiled sides (16).

8. In the rack in accordance with claim 7, wherein a plurality of exterior walls (20) are arranged parallel with the interior wall elements (30', 30"), and a plurality of shafts for one of cables, insulating material and absorbing material are formed between the interior wall elements (30', 30") and the exterior walls (20).

9. In the rack in accordance with claim 2, wherein the assembly rails (40, 50) are formed with a U-shaped cross section by a support section (42) and two connected strips (41, 51) spaced apart parallel from each other.

10. In the rack in accordance with claim 9, wherein the strips (41, 51) of the assembly rail (40, 50) have fastener retainers (45, 46, 55, 56) therein.

11. In the rack in accordance with claim 9, wherein a plurality of projecting tabs (43, 53) are formed on the support section (42, 52) of the assembly rail (40, 50) and fixed in place on one of the fastening sections (17) and the profiled sides (16), and the projecting tabs (43, 53) are offset in relation to the support section (42, 52), so that the support section (42, 52) lies on a level formed by one of the profiled sides (16) and the fastening sections (17).

12. In a rack having frame legs (10) for a switchgear cabinet, wherein the frame legs have two fastening shoulders (10.1, 10.2), each of the fastening shoulders (10.1, 10.2) adapted for receiving an exterior wall selected from a group of two perpendicular walls of the switchgear cabinet, each of the fastening shoulders (10.1, 10.2) having a fastening section (17) arranged parallel with the exterior wall of the rack and a profiled side (16) arranged perpendicularly with the exterior wall, and wherein the fastening sections and the profiled sides have rows of fastener retainers (16', 17') spaced apart at equal distances, the improvement comprising:

a perpendicular distance between the profiled side (16) of the one fastening shoulder (10.1) and the fastening section (17) of the other fastening shoulder (10.2) is equal to a distance between centers of adjacent similar fastener retainers in any said row of fastener retainers, and a plurality of interior wall elements (30', 30") each attached to one of the fastening shoulders (10.1, 10.2) at at least one of the fastening section (17) and the profiled side (16).

13. In the rack in accordance with claim 12, wherein a plurality of exterior walls (20) are arranged parallel with the interior wall elements (30', 30").

* * * * *